W. Disbrow,

Horseshoe.

N° 46,087. Patented Jan. 31, 1865.

Witnesses
C. L. Topliff
Harry Morris

Inventor
William Disbrow
per Munn & Co
attorneys

UNITED STATES PATENT OFFICE.

WILLIAM DISBROW, OF SAN FRANCISCO, CALIFORNIA.

IMPROVED HORSESHOE.

Specification forming part of Letters Patent No. 46,087, dated January 31, 1865.

*To all whom it may concern:*

Be it known that I, WILLIAM DISBROW, of San Francisco, in the county of San Francisco and State of California, have invented a new and Improved Horseshoe; and I do hereby declare that the following is a full, clear, and exact description thereof, which will enable those skilled in the art to make and use the same, reference being had to the accompanying drawings, forming part of this specification, in which—

Figure 1:
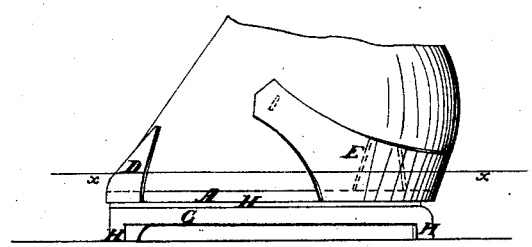
Figure 2:
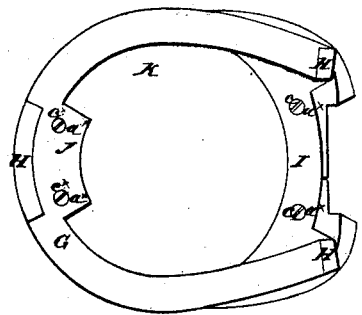
Figure 3:
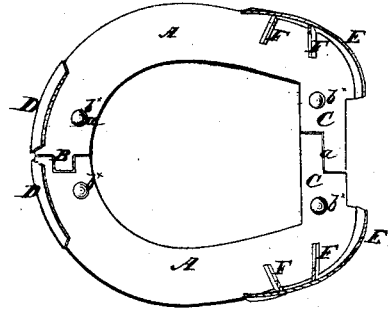

Figure 1 is a side view of my invention applied to a horse's hoof or foot; Fig. 2, a bottom view or an inverted plan of the same; Fig. 3, a horizontal section of the same, taken in the line $x\ x$, Fig. 1.

Similar letters of reference indicate corresponding parts.

This invention relates to a new and improved horseshoe, by which the latter may be secured to the hoof or foot without the aid of nails, and which will admit of being applied to and detached from the hoof or foot with the greatest facility.

In carrying out my invention I employ two separate and distinct parts, one of which is attached directly to the foot or hoof, and to which the other part is secured by screws.

The part of the shoe which is attached to the hoof is composed of two equal parts, A A, connected at their front ends by a hinge, B, and provided at their back ends with bars C C, which project inward and extend across the back part of the hoof, and are notched or recessed at their ends to form a lap, as shown at $a$ in Fig. 3. The front end of each part A is provided with a toe-piece, D, of triangular form, and these toe-pieces rest or bear against the front of the hoof, the former being inclined backward to correspond to the inclination of the hoof, as shown clearly in Fig. 1, and to the rear of each part A there is attached a plate, E, which extends upward at each side of the hoof, as shown in Fig. 1. To the inner side of each plate E there are attached two plates, F F, which have an oblique position relatively with each other, as shown in Fig. 3, and by the dotted lines in Fig. 1. These plates F F fit in grooves made in the sides of the hoof, and the oblique position of the plates F form a dovetail, which effectually secures the rear ends of the parts A A to the rear part of the hoofs, while the toe-pieces D D secure the front ends of said parts to the hoofs, the plates and toe-pieces preventing any forward or backward movement or slipping of the parts, as well as any downward movement of the same from the hoof. The parts A A are made to correspond in shape to the bottom of the hoof, as shown clearly in Fig. 3. The other part, G, of the shoe is composed of a single piece of metal, and is of the form of an ordinary horseshoe, and provided with the usual calks, H. The back ends of G are connected by a cross-bar, I, and the front end at its inner side is provided with a plate, J. The bar I and the plate J have each two screw-holes, $a^\times$, made in them, and corresponding holes, $b^\times$, are made in the front ends of the parts A A and in the bars C C. The part G is secured to the parts A A by screws $c^\times$, passing into said holes. A piece of leather, india-rubber, or other suitable material, K, is interposed between the parts A A and G, and said material may extend over the whole under surface of the foot or hoof. This material K protects the frog of the foot, keeping it moist, and in many cases is very desirable. It also preserves the foot from jars and concussions. The part G, it will be seen, prevents the parts A A from folding or turning at the hinge, and said parts, when G is detached, may be readily removed from the hoof.

The device is extremely simple, may be readily applied to and detached from the hoof.

I claim as new and desire to secure by Letters Patent—

A horseshoe composed of the parts A A and G, the former being connected by a hinge, B, at their front ends, and provided with toe-pieces D D and heel-plates E E, the latter having oblique plates F F, which enter notches or grooves made in the sides of the hoof, and the part G secured to the parts A A by screws, the whole being constructed, combined, and arranged either with or without the leather or other material, K, substantially as and for the purpose herein shown and described.

WILLIAM DISBROW.

Witnesses:
H. J. WELLS,
C. F. CRADDOCK.